United States Patent
Ko et al.

(10) Patent No.: US 11,956,078 B2
(45) Date of Patent: *Apr. 9, 2024

(54) METHOD OF TRANSMITTING AND RECEIVING SYSTEM INFORMATION AND DEVICE THEREFOR

(71) Applicant: LG ELECTRONICS INC., Seoul (KR)

(72) Inventors: Hyunsoo Ko, Seoul (KR); Kijun Kim, Seoul (KR); Eunsun Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,975

(22) Filed: Dec. 6, 2022

(65) Prior Publication Data

US 2023/0106192 A1    Apr. 6, 2023

Related U.S. Application Data

(63) Continuation of application No. 16/877,734, filed on May 19, 2020, now Pat. No. 11,569,937, which is a
(Continued)

(51) Int. Cl.
*H04L 1/00* (2006.01)
*H04L 1/1812* (2023.01)
(Continued)

(52) U.S. Cl.
CPC .......... *H04L 1/0061* (2013.01); *H04L 1/1819* (2013.01); *H04W 48/12* (2013.01);
(Continued)

(58) Field of Classification Search
CPC ........... H04W 72/042; H04W 72/0446; H04W 72/0406; H04W 72/12; H04W 72/1289;
(Continued)

(56) References Cited

U.S. PATENT DOCUMENTS

2010/0034161 A1    2/2010  Luo ........................ H04B 1/707
                                                               370/329
2014/0198708 A1    7/2014  Lee
(Continued)

FOREIGN PATENT DOCUMENTS

CN    101594286 A    12/2009
CN    101594286 A    12/2009
(Continued)

OTHER PUBLICATIONS

R1-1710030: 3GPP TSG RAN WG1 NR Ad-Hoc#2, Qingdao, P.R. China, Jun. 27-30, 2017, "Delivery of Other System Information," CATT (3 Pages).
(Continued)

*Primary Examiner* — Peter Chen
(74) *Attorney, Agent, or Firm* — BRYAN CAVE LEIGHTON PAISNER LLP

(57) ABSTRACT

The present disclosure provides a method of receiving system information by a user equipment in a wireless communication system. Particularly, the method may include receiving a Physical Downlink Control Channel (PDCCH) including Downlink Control Information (DCI) for scheduling the system information; descrambling a Cyclic Redundancy Check (CRC) of the DCI based on a System Information-Radio Network Temporary Identifier (SI-RNTI); obtaining first information on a type of the system information from a specific bit included in the DCI; receiving the system information based on second information for scheduling the system information, which is included in the DCI; and determining the type of the system information based on the first information.

12 Claims, 11 Drawing Sheets

Related U.S. Application Data continuation of application No. 16/316,690, filed as application No. PCT/KR2018/014131 on Nov. 16, 2018, now Pat. No. 10,693,592.

(60) Provisional application No. 62/587,481, filed on Nov. 17, 2017.

(51) Int. Cl.

| | | |
|---|---|---|
| *H04L 5/00* | (2006.01) | |
| *H04W 48/12* | (2009.01) | |
| *H04W 56/00* | (2009.01) | |
| *H04W 72/12* | (2023.01) | |
| *H04W 72/23* | (2023.01) | |
| *H04W 74/08* | (2009.01) | |
| *H04W 74/0833* | (2024.01) | |
| *H04W 76/11* | (2018.01) | |

(52) U.S. Cl.
CPC ......... *H04W 56/001* (2013.01); *H04W 72/12* (2013.01); *H04W 72/23* (2023.01); *H04W 74/0833* (2013.01); *H04W 76/11* (2018.02); *H04L 5/0007* (2013.01)

(58) Field of Classification Search
CPC . H04W 72/23; H04W 74/0833; H04W 48/12; H04W 76/11; H04W 56/001; H04L 5/0007; H04L 5/0035; H04L 1/0061; H04L 1/1819; H04L 1/1887
See application file for complete search history.

(56) References Cited

U.S. PATENT DOCUMENTS

| | | | |
|---|---|---|---|
| 2015/0103800 A1 | 4/2015 | Seo et al. | |
| 2015/0173054 A1 | 6/2015 | Ohta | H04L 5/0053 370/329 |
| 2015/0271006 A1 | 9/2015 | Han | H04L 1/001 370/329 |
| 2016/0234736 A1 | 8/2016 | Kubota et al. | |
| 2017/0079065 A1 | 3/2017 | Lyu | H04W 72/04 |
| 2019/0110290 A1 | 4/2019 | Sun | H04L 5/0053 |
| 2019/0123992 A1 | 4/2019 | Ly | H04L 43/103 |
| 2019/0215906 A1 | 7/2019 | Phuyal | H04L 1/1854 |
| 2019/0349149 A1 | 11/2019 | Nam | H04L 5/005 |
| 2020/0236699 A1 | 7/2020 | Nakashima | H04W 72/1289 |
| 2020/0351760 A1 | 11/2020 | Wu | H04L 1/00 |
| 2020/0366398 A1 | 11/2020 | Takeda | H04W 72/04 |

FOREIGN PATENT DOCUMENTS

| | | | |
|---|---|---|---|
| EP | 2341679 A2 | 7/2011 | |
| EP | 3413631 A1 | 12/2018 | |
| JP | 2017514325 A | 6/2017 | |
| KR | 1020150042845 A | 4/2015 | |
| KR | 20160108544 A | 9/2016 | |
| KR | 1020160108544 A | 9/2016 | |
| WO | 2014045322 A1 | 8/2016 | |
| WO | 2017100355 A1 | 6/2017 | |
| WO | 2017197063 A1 | 11/2017 | |
| WO | 2017135042 A1 | 11/2018 | |
| WO | WO-2019192319 A1 | 10/2019 | ............... H04L 1/00 |

OTHER PUBLICATIONS

R2-1711514: 3GPP TSG-RAN WG2 Meeting #99bis, Prague, Czech Republic, Oct. 9-13, 2017, Qualcomm Incorporated, "Organization of NR System Information," (2 Pages).
Samsung, "Other System Information Delivery", R1-1715911, 3GPP TSG RAN WG1 Meeting NR#3, Sep. 12, 2017. See sections 2-4; and figure 3. (Year: 2017).
LG Electronics, "RACH procedure", 3GPP TSG RAN WG1 Meeting NR#3, Sep. 18-21, 2017, R1-1715846.
Samsung, "Other system information delivery", 3GPP TSG RAN WG1 Meeting NR#3, Sep. 18-21, 2017, R1-1715911.
Machine-translated document of CN-101594286-A (Year: 2009).

FIG. 1
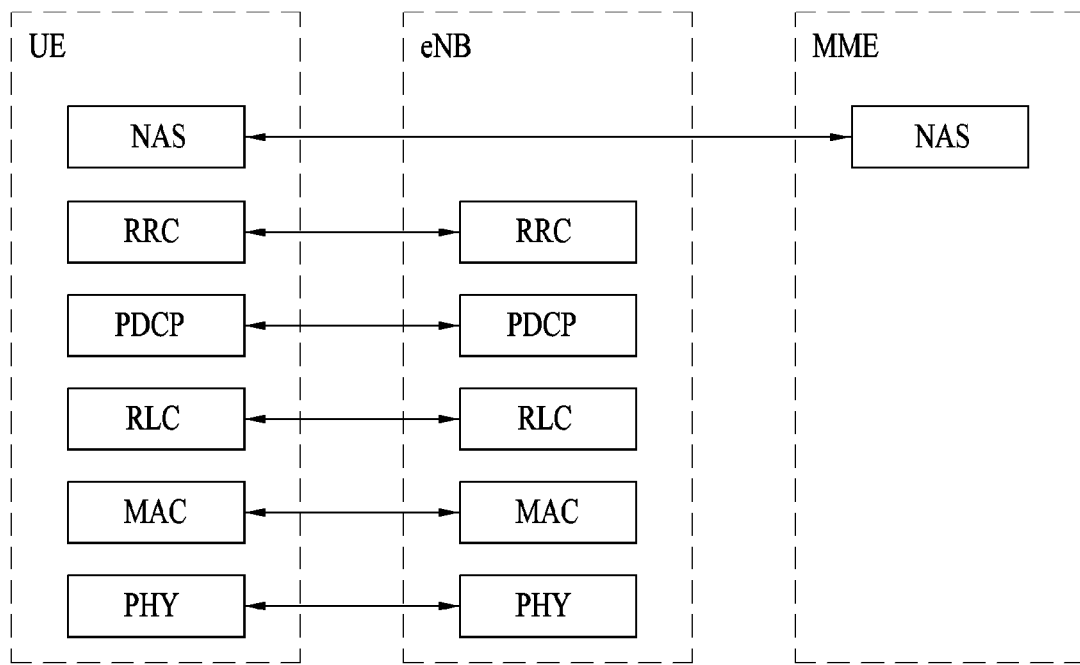
(A) CONTROL-PLANE PROTOCOL STACK
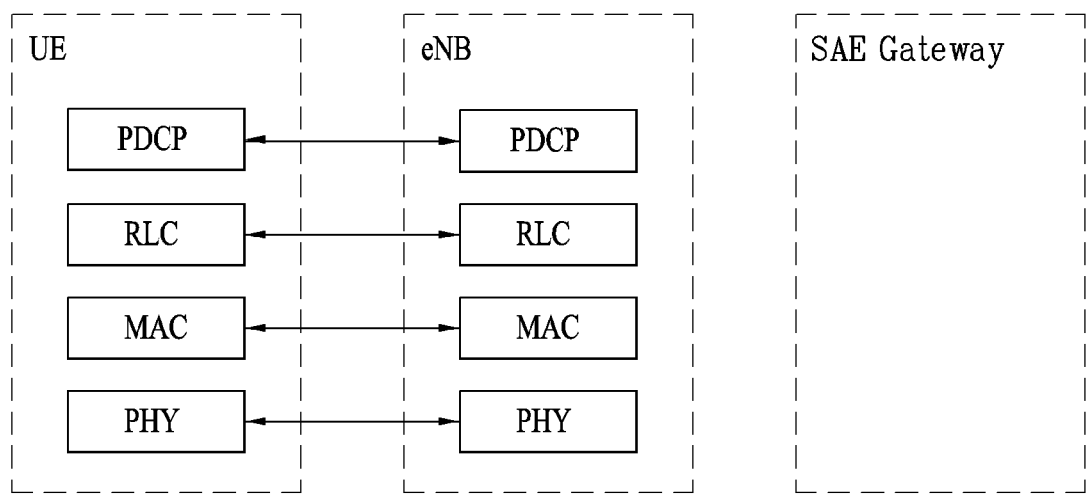
(B) USER-PLANE PROTOCOL STACK

METHOD OF TRANSMITTING AND RECEIVING SYSTEM INFORMATION AND DEVICE THEREFOR

This application is a continuation application of U.S. patent application Ser. No. 16/877,734 filed on May 19, 2020, issued as U.S. Pat. No. 11,569,937, which is a continuation application of U.S. patent application Ser. No. 16/316,690 filed on Jan. 10, 2019, issued as U.S. Pat. No. 10,693,592, which is a National Stage Entry of International Application No. PCT/KR2018/014131 filed on Nov. 16, 2018, and claims priority to U.S. Provisional Application No. 62/587,481 filed on Nov. 17, 2017, all of which are hereby incorporated by reference in their entireties as if ully set forth herein.

TECHNICAL FIELD

The present disclosure relates to a method of transmitting and receiving system information and device therefor, and more particularly, to a method of indicating a type of system information scheduled by Downlink Control Information (DCI) through a system information identifier included in the DCI and device therefor.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE OF THE INVENTION

Technical Task

The object of the present invention is to provide a method of transmitting and receiving system information and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an embodiment of the present invention, provided is a method of receiving system information by a user equipment in a wireless communication system. The method may include: receiving a Physical Downlink Control Channel (PDCCH) including Downlink Control Information (DCI) for scheduling the system information; descrambling a Cyclic Redundancy Check (CRC) of the DCI based on a System Information-Radio Network Temporary Identifier (SI-RNTI); obtaining first information on a type of the system information from a specific bit included in the DCI; receiving the system information based on second information for scheduling the system information, which is included in the DCI; and determining the type of the system information based on the first information.

In this case, the SI-RNTI may be same regardless of the type of the system information.

In addition, the first information may be obtained based on a bit for a Hybrid Automatic Repeat Request (HARQ) process Identification (ID).

Moreover, whether the system information is either Remaining Minimum System Information (RMSI) or Other System Information (OSI) may be determined based on the first information.

In another embodiment of the present invention, provided is a communication device for receiving system information in a wireless communication system. The communication device may include: a memory; and a processor connected to the memory. In this case, the processor may be configured to: receive a Physical Downlink Control Channel (PDCCH) including Downlink Control Information (DCI) for scheduling the system information; descramble a Cyclic Redundancy Check (CRC) of the DCI based on a System Information-Radio Network Temporary Identifier (SI-RNTI); obtain first information on a type of the system information from a specific bit included in the DCI; receive the system information based on second information for scheduling the system information, which is included in the DCI; and determine the type of the system information based on the first information.

In this case, the SI-RNTI may be same regardless of the type of the system information.

In addition, the first information may be obtained based on a bit for a Hybrid Automatic Repeat Request (HARQ) process Identification (ID).

Moreover, whether the system information is either Remaining Minimum System Information (RMSI) or Other System Information (OSI) may be determined based on the first information.

In still another embodiment of the present invention, provided is a method of transmitting system information by a base station in a wireless communication system. The method may include: generating Downlink Control Information (DCI) including first information on a type of the system information and second information for scheduling the system information; scrambling a Cyclic Redundancy Check (CRC) of the DCI based on a System Information-Radio Network Temporary Identifier (SI-RNTI); transmitting a Physical Downlink Control Channel (PDCCH) including the DCI; and transmitting the system information based on the second information. The first information may be transmitted through a specific bit included in the DCI.

In this case, the SI-RNTI may be same regardless of the type of the system information.

In addition, the first information may be obtained based on a bit for a Hybrid Automatic Repeat Request (HARQ) process Identification (ID).

Moreover, whether the system information is either Remaining Minimum System Information (RMSI) or Other System Information (OSI) may be determined based on the first information.

Advantageous Effects

According to the present invention, a UE can efficiently understand the type of received system information even when a Control Resource Set (CORESET) of RMSI is equal to that of OSI.

It will be appreciated by persons skilled in the art that the effects that can be achieved with the present disclosure are not limited to what has been particularly described hereinabove and other effects of the present disclosure will be more clearly understood from the following detailed description taken in conjunction with the accompanying drawings.

DESCRIPTION OF DRAWINGS

FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.

BEST MODE FOR INVENTION

Figure 2:
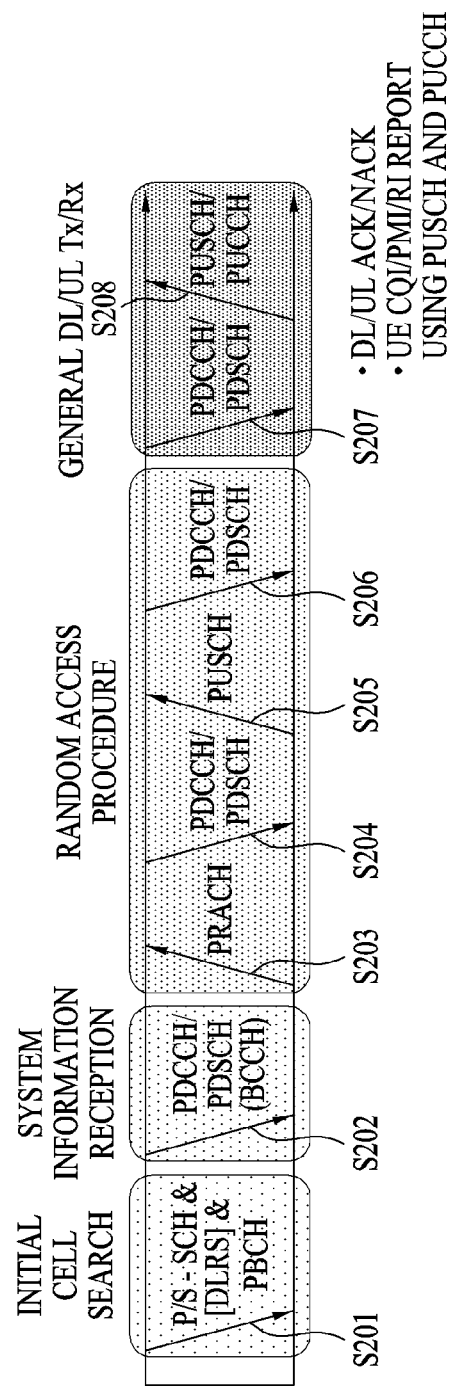
FIG. 2 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
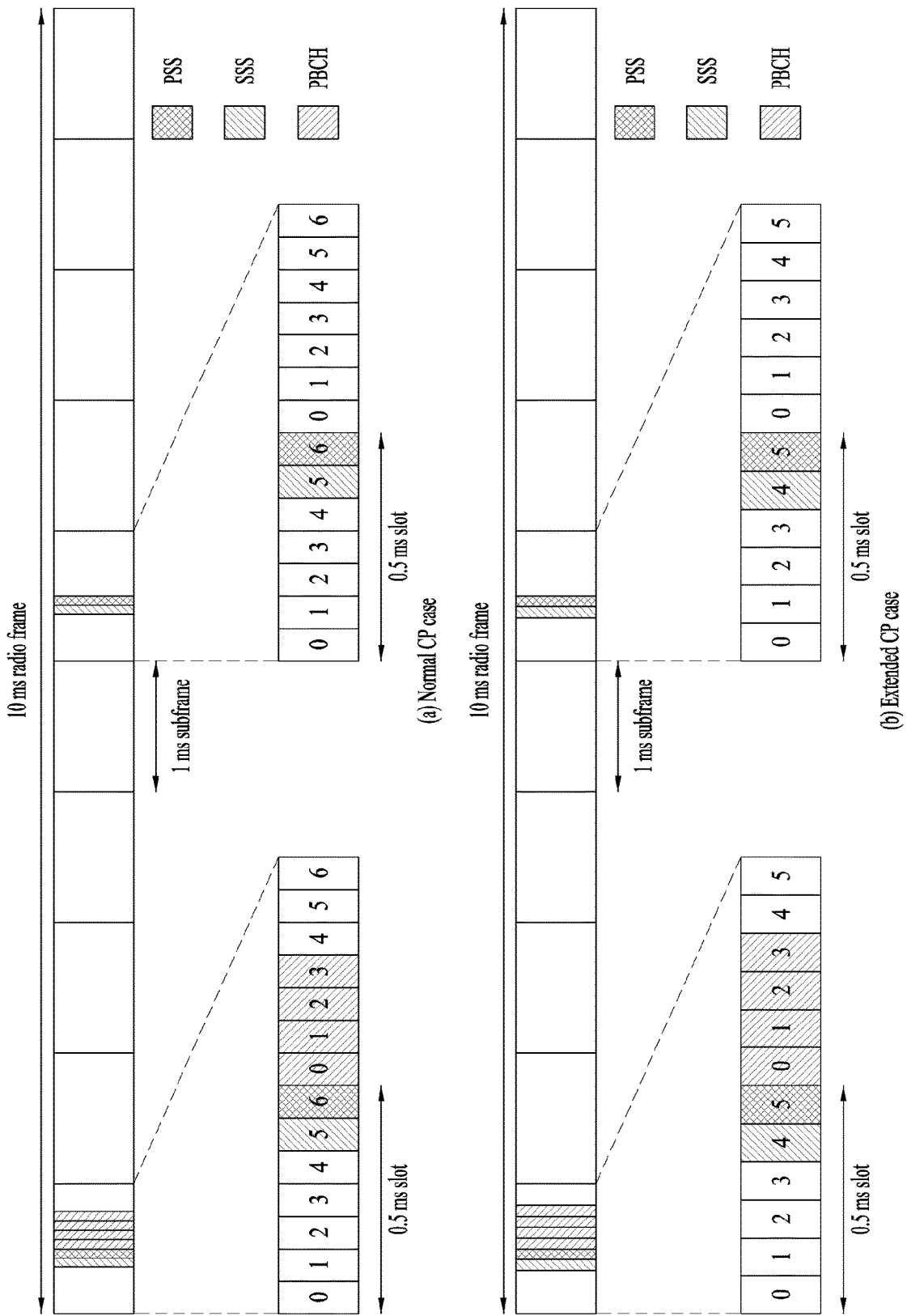
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b) shows positions at which the SS and the PBCH are transmitted in a radio frame configured by an extended CP.

Figure 4:
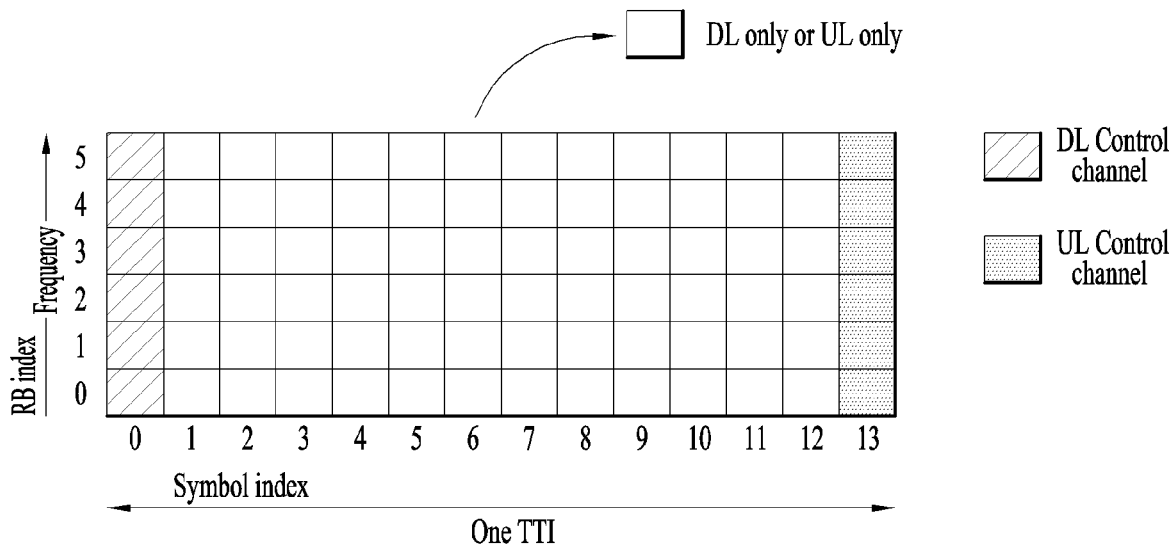
FIG. 4 is a view illustrating an exemplary slot structure available in new radio access technology (NR).

An SS will be described in more detail with reference to FIG. 3. An SS is categorized into a primary synchronization signal (PSS) and a secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)

Step 2: Random access response (RAR) (via PDCCH and PDSCH (eNB to)

Step 3: layer 2/Layer 3 message (via PUSCH) (UE to eNB)

Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)

Step 1: RACH preamble (via PRACH) (UE to eNB)

Step 2: Random access response(RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

<OFDM Numerology>

A New RAT system adopts an OFDM transmission scheme or a transmission scheme similar to the OFDM transmission scheme. The New RAT system may use different OFDM parameters from LTE OFDM parameters. Or the New RAT system may follow the numerology of legacy LTE/LTE-A but have a larger system bandwidth (e.g., 100 MHz). Or one cell may support a plurality of numerologies. That is, UEs operating with different numerologies may co-exist within one cell.

<Subframe Structure>

In the 3GPP LTE/LTE-A system, a radio frame is 10 ms ($307200T_s$) long, including 10 equal-size subframes (SFs). The 10 SFs of one radio frame may be assigned numbers. $T_s$ represents a sampling time and is expressed as $T_s=1/(2048*15 \text{ kHz})$. Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

FIG. 4 illustrates an exemplary slot structure available in the new radio access technology (NR).

To minimize a data transmission delay, a slot structure in which a control channel and a data channel are multiplexed in time division multiplexing (TDM) is considered in $5^{th}$ generation (5G) NR.

In FIG. 4, an area marked with slanted lines represents a transmission region of a DL control channel (e.g., PDCCH) carrying DCI, and a black part represents a transmission region of a UL control channel (e.g., PUCCH) carrying UCI. DCI is control information that a gNB transmits to a UE and may include information about a cell configuration that a UE should know, DL-specific information such as DL scheduling, and UL-specific information such as a UL grant. Further, UCI is control information that a UE transmits to a gNB. The UCI may include an HARQ ACK/NACK report for DL data, a CSI report for a DL channel state, a scheduling request (SR), and so on.

In FIG. 4, symbols with symbol index 1 to symbol index 12 may be used for transmission of a physical channel (e.g., PDSCH) carrying DL data, and also for transmission of a physical channel (e.g., PUSCH) carrying UL data. According to the slot structure illustrated in FIG. 2, as DL transmission and UL transmission take place sequentially in one slot, transmission/reception of DL data and reception/transmission of a UL ACK/NACK for the DL data may be performed in the one slot. As a consequence, when an error is generated during data transmission, a time taken for a data retransmission may be reduced, thereby minimizing the delay of a final data transmission.

In this slot structure, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the legacy LTE/LTE-A system, a DL control channel is multiplexed with a data channel in TDM, and a control channel, PDCCH is transmitted distributed across a total system band. In NR, however, it is expected that the bandwidth of one system will be at least about 100 MHz, which makes it inviable to transmit a control channel across a total band. If a UE monitors the total band to receive a DL control channel, for data transmission/reception, this may increase the battery consumption of the UE and decrease efficiency.

Therefore, a DL control channel may be transmitted localized or distributed in some frequency band within a system band, that is, a channel band in the present disclosure.

In the NR system, a basic transmission unit is a slot. A slot duration includes 14 symbols each having a normal cyclic prefix (CP), or 12 symbols each having an extended CP. Further, a slot is scaled in time by a function of a used subcarrier spacing. That is, as the subcarrier spacing increases, the length of a slot decreases. For example, given 14 symbols per slot, if the number of slots in a 10-ms frame is 10 for a subcarrier spacing of 15 kHz, the number of slots is 20 for a subcarrier spacing of 30 kHz, and 40 for a subcarrier spacing of 60 kHz. As the subcarrier spacing increases, the length of an OFDM symbol decreases. The number of OFDM symbols per slot is different depending on the normal CP or the extended CP and does not change according to a subcarrier spacing. The basic time unit for LTE, $T_s$ is defined as $1/(15000*2048)$ seconds, in consideration of the basic 15-kHz subcarrier spacing and a maximum FFT size of 2048. $T_s$ is also a sampling time for the 15-kHz subcarrier spacing. In the NR system, many other subcarrier spacings than 15 kHz are available, and since a subcarrier spacing is inversely proportional to a corresponding time length, an actual sampling time $T_s$ corresponding to subcarrier spacings larger than 15 kHz becomes shorter than $1/(15000*2048)$ seconds. For example, the actual sampling time for the subcarrier spacings of 30 kHz, 60 kHz, and 120 kHz may be $1/(2*15000*2048)$ seconds, $1/(4*15000*2048)$ seconds, and $1/(8*15000*2048)$ seconds, respectively.

<Analog Beamforming>

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Figure 5:
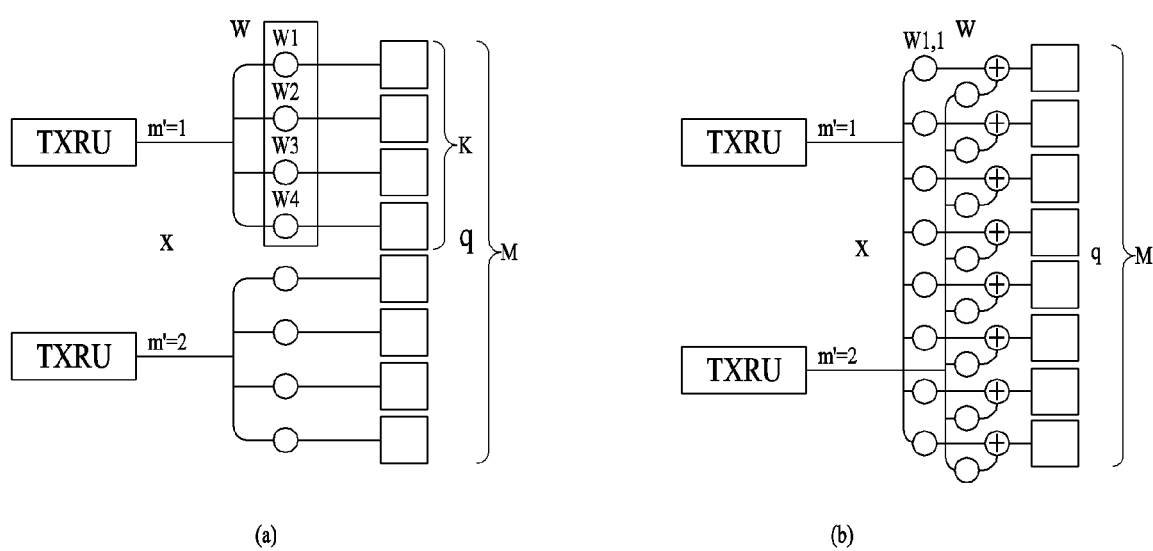
FIG. 5 is a view illustrating exemplary connection schemes between transceiver units (TXRUs) and antenna elements.

FIG. 5 is a view illustrating exemplary connection schemes between TXRUs and antenna elements.

(a) of FIG. 5 illustrates connection between a TXRU and a sub-array. In this case, an antenna element is connected only to one TXRU. In contrast, (b) of FIG. 5 illustrates connection between a TXRU and all antenna elements. In this case, an antenna element is connected to all TXRUs. In FIG. 5, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present invention is proposed by reflecting limitations caused by the nature of analog BF or hybrid BF.

<Hybrid Analog Beamforming>

Figure 6:
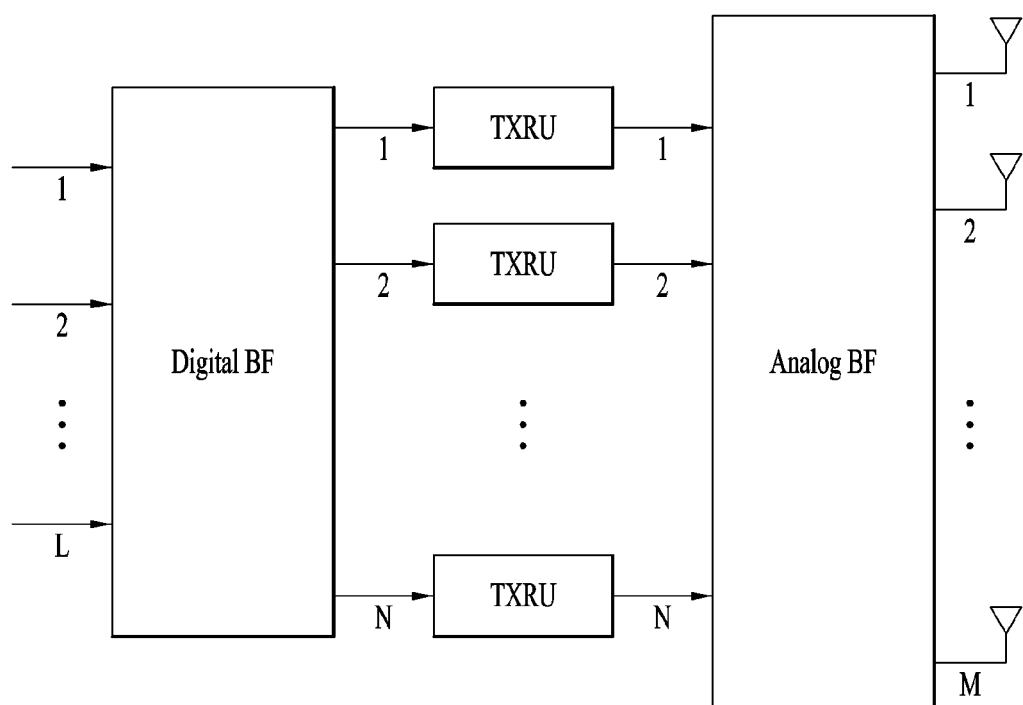
FIG. 6 is a view abstractly illustrating a hybrid beamforming structure in terms of TXRUs and physical antennas.

FIG. 6 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 6, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 7:
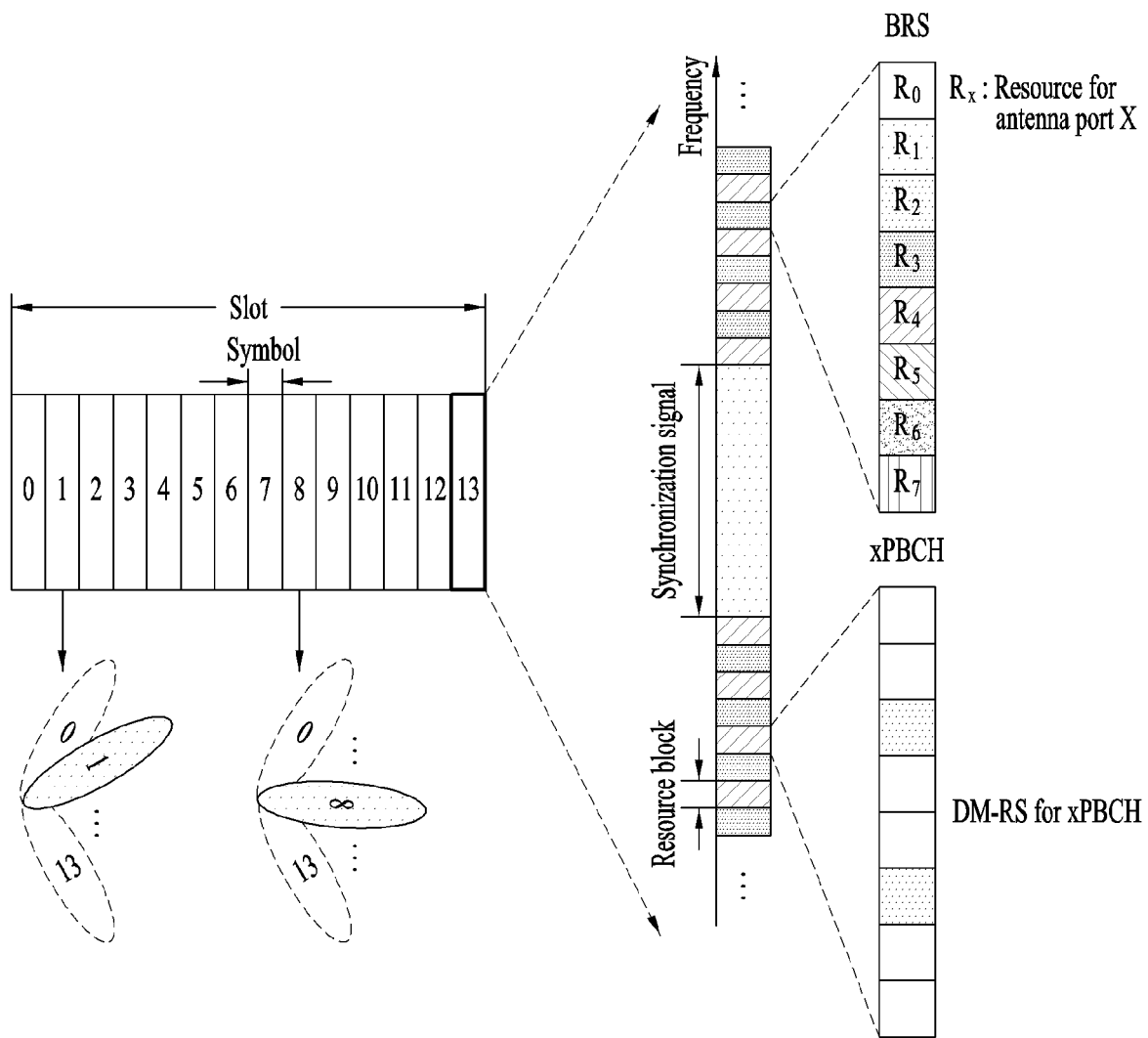
FIG. 7 is a view illustrating beam sweeping for a synchronization signal and system information during downlink (DL) transmission.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 7 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 8:
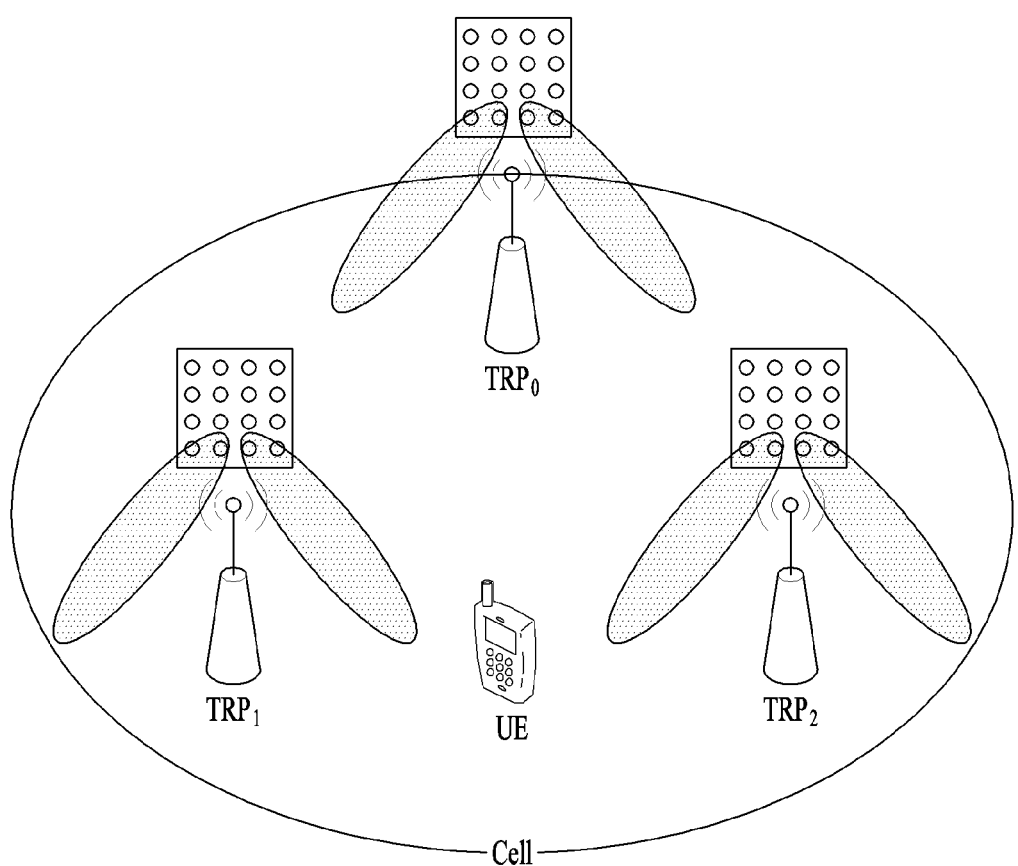
FIG. 8 is a view illustrating an exemplary cell in an NR system.

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Hereinafter, a method of indicating a system information type according to an embodiment of the present disclosure will be described. Meanwhile, in the following description, Remaining Minimum System Information (RMSI), which corresponds to system information obtained from a Master Information Block (MIB) included in a PBCH, can be referred to as System Information Block b1 (SIB1). In addition, Other System Information (OSI) may mean remaining SIBs except the MIB and SIB1

Minimum information means essential system information required for a UE to access a network, and more particularly, to perform PRACH transmission, msg. 2/4 reception, and msg.3 transmission. To this end, some of the minimum information is transmitted though the MIB in the PBCH, and the rest of the minimum information is transmitted as the RMSI after transmission of the PBCH. In other words, the MIB in the PBCH provides configuration/scheduling information of the RMSI.

Meanwhile, the OSI is system information that the UE obtains after the acquisition of the RMSI. That is, the RMSI provides configuration/scheduling information of the OSI. Since the OSI is broadcasted and frequency region information for receiving the broadcasted OSI is identical to frequency region information for receiving the RMSI, if the UE already has the frequency region information for receiving the RMSI, the UE can know the frequency region information for receiving the OSI.

However, in the case of time region information, a monitoring window for receiving an RMSI PDCCH may be different from a monitoring window for receiving an OSI PDCCH. That is, the duration and period of the RMSI PDCCH monitoring window may be different from those of the OSI PDCCH monitoring window.

More specifically, parameters for an OSI CORESET, i.e., the frequency location, bandwidth, and numerology of the OSI CORESET may be equal to parameters for an RMSI CORESET, i.e., the frequency location, bandwidth, and numerology of the RMSI CORESET.

However, since time information of the OSI CORESET may be different from that of the RMSI CORESET, the time information of the OSI CORESET should be explicitly signaled through the RMSI.

In other words, the time information of the RMSI CORESET, i.e., the RMSI PDCCH monitoring window is defined by duration and a monitoring period within one slot. Therefore, the OSI PDCCH monitoring window is defined by duration and a monitoring period in a similar way to the RMSI PDCCH monitoring window.

Information on the OSI PDCCH monitoring window is explicitly signaled through the RMSI, and there may be an overlapped region over a certain size between the OSI PDCCH monitoring window and the RMSI PDCCH monitoring window.

From the perspective of a UE, this can be interpreted as follows. There may be PDCCH/PDSCH for the RMSI and PDCCH/PDSCH for the OSI within one slot. That is, the UE can blindly detect a plurality of pieces of DCI for the system information, and thus the UE needs to determine whether detected DCI is for either the RMSI or OSI.

In general, DCI scheduling system information is masked with a System Information-Radio Network Temporary Identifier (SI-RNTI) to identify UE-specific DCI. Thus, if a network is able to transmit multiple DCI for the system information, the SI-RNTI may be defined differently for each SIB. For example, different SI-RNTIs may be configured for the RMSI and OSI, respectively.

As another method, a common SI-RNTI can be used for all SIBs regardless of SIB types or SIB indices. In this case, if multiple DCI scheduling SIBs are able to be transmitted in a PDCCH monitoring window within a slot, it may be more effective to identify an SIB type using a specific field of the DCI scheduling the system information. For example, an HARQ process ID may be configured for the DCI scheduling the system information. For the RMSI, i.e., SIB 1/2, the HARQ process ID may be set to 0, and for the OSI, i.e., SIB-x except SIB 1/2, the HARQ process ID may be set to X in an HARQ process ID field. In other words, when scrambling is performed with the SI-RNTI, it is possible to distinguish between SIB types using the HARQ process ID field. Therefore, to distinguish between the SIB types, i.e., the RMSI and OSI using the DCI, each of the DCI scheduling the RMSI and the DCI scheduling the OSI should have a unique HARQ process ID corresponding to each system information type.

In addition, UE operation and system design may vary according to the above-described embodiment. Therefore, the common SI-RNTI are required for the RMSI and OSI.

Assuming that the DCI scheduling the RMSI has the HARQ process ID set to 0 and includes a redundancy version (RV) for the RMSI, the UE may be allowed to combine data, i.e., the RMSI. Similarly, the DCI scheduling the OSI needs to have an HARQ process ID different from that allocated to the RMSI, and thus the UE can recognize that scheduled data is the OSI, which is different from the RMSI. As in the SIB of the LTE system, the OSI can be divided into several blocks. In this case, if the DCI is generated per OSI, divided SIB, or broadcasted OSI should be determined.

The DCI generation per SIB type has an advantage in that a UE can perform combination per SIB type based on an HARQ process ID, but it may cause the UE excessive buffering. Therefore, the network mat give priority to some combinable SIBs, and in this case, the other remaining SIBs, which do not have priority, may not be combined. By combining only some of the SIBs based on the priority as described above, it is possible to identify an SIB type or an SIB group using the HARQ process ID in the DCI.

Meanwhile, when the DCI has an RV value, a UE may combine scheduled data with the same HARQ process ID. On the contrary, when the DCI has no RV, the UE is not allowed to combine the scheduled data. In other words, the UE cannot combine the scheduled data.

The above embodiments will be described in detail with reference to FIGS. 9 to 11.

Figure 9:
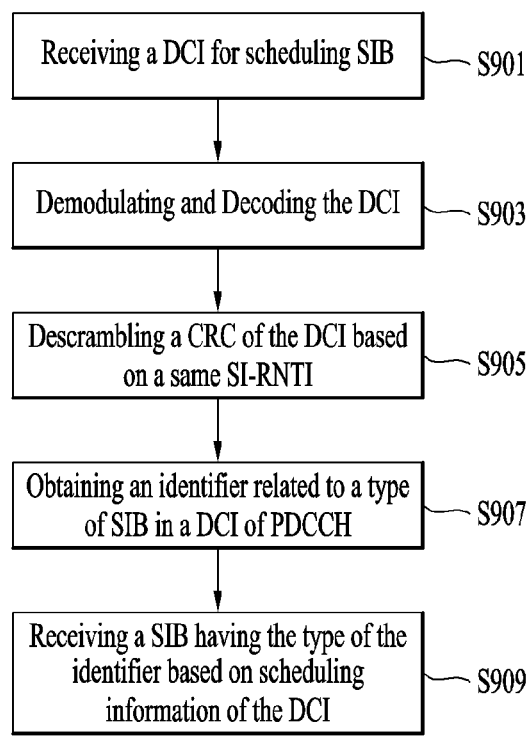
FIGS. 9 to 11 are flowcharts illustrating methods of indicating a system information type according to embodiments of the present invention.
Figure 10:
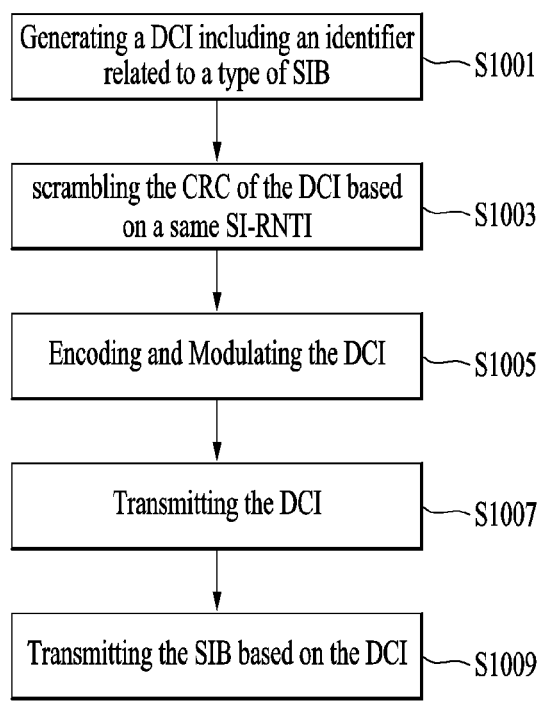

FIG. 9 is a flowchart for explaining the above-described embodiments from the perspective of UE operation.

A UE receives DCI for scheduling an SIB [S901]. Subsequently, the UE demodulate and decodes the DCI [S903] and descrambles a CRC of the DCI using one same SI-RNTI regardless of SIB types [S905]. Thereafter, the UE obtains a value for identifying an SIB type from a specific bit of the DCI, and in this case, the UE may use bits for an HARQ process ID as the bit for identifying the SIB type. That is, the UE may identify the SIB type using the bits for the HARQ process ID or based on the HARQ process ID if one HARQ process ID has a corresponding relationship with one SIB type [S907]. Upon identifying the SIB type, the UE receives the SIB based on scheduling information of a PDSCH included in the DCI and analyzes information in the SIB [S909].

Hereinafter, the above-described embodiments will be described from the perspective of a BS with reference to FIG. 10. A BS generates DCI by setting a bit for an HARQ process ID, which is included in the DCI, to a bit value in accordance with a type of an SIB scheduled by the DCI [S1001]. Subsequently, the BS scrambles a CRC of the DCI using one same SI-RNTI value regardless of SIB types [S1003] and encodes and modulates the DCI [S1005]. Thereafter, the BS transmits the DCI to a UE [S1007] and transmits, to the UE, a PDSCH including the SIB having the type in accordance with the bit value based on scheduling information of the DCI [S1009].

Figure 11:
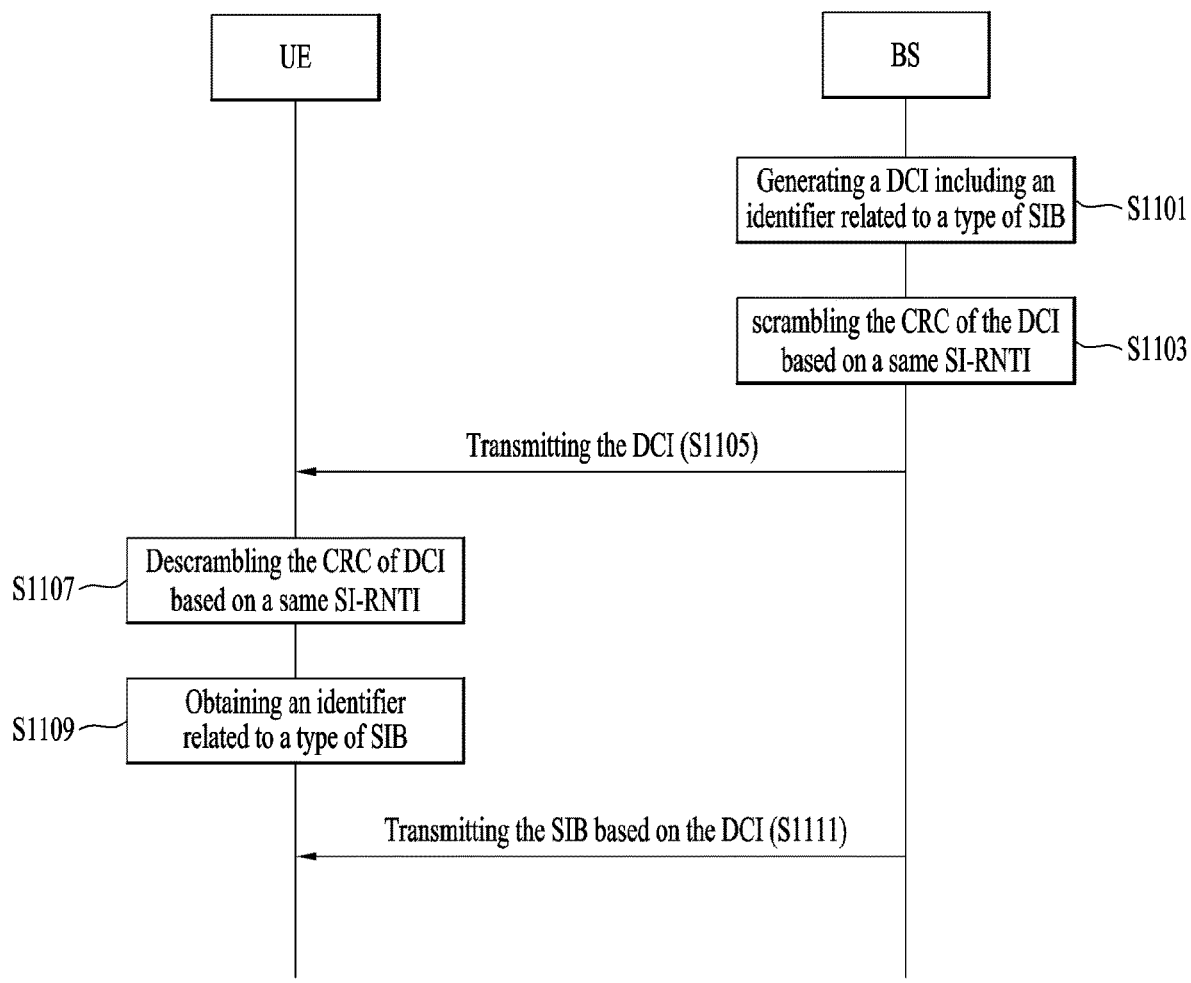

With reference to FIG. 11, the aforementioned embodiments will be described from the perspective of a system. A BS generates DCI by configuring a bit value for identifying a type of an SIB using a bit for an HARQ process ID [S1101] and scrambles a CRC of the DCI using one same SI-RNTI [S1103]. Thereafter, the BS transmits the DCI to a UE [S1105]. Upon receiving the DCI, the UE descrambles the CRC of the DCI using the one same SI-RNTI [S1107] and identifies the type of the SIB scheduled by the DCI using the bit for the HARQ process ID [S1109]. Thereafter, the UE receives, from the BS, the SIB according to the identified SIB type based on scheduling information of the DCI [S1111].

Figure 12:
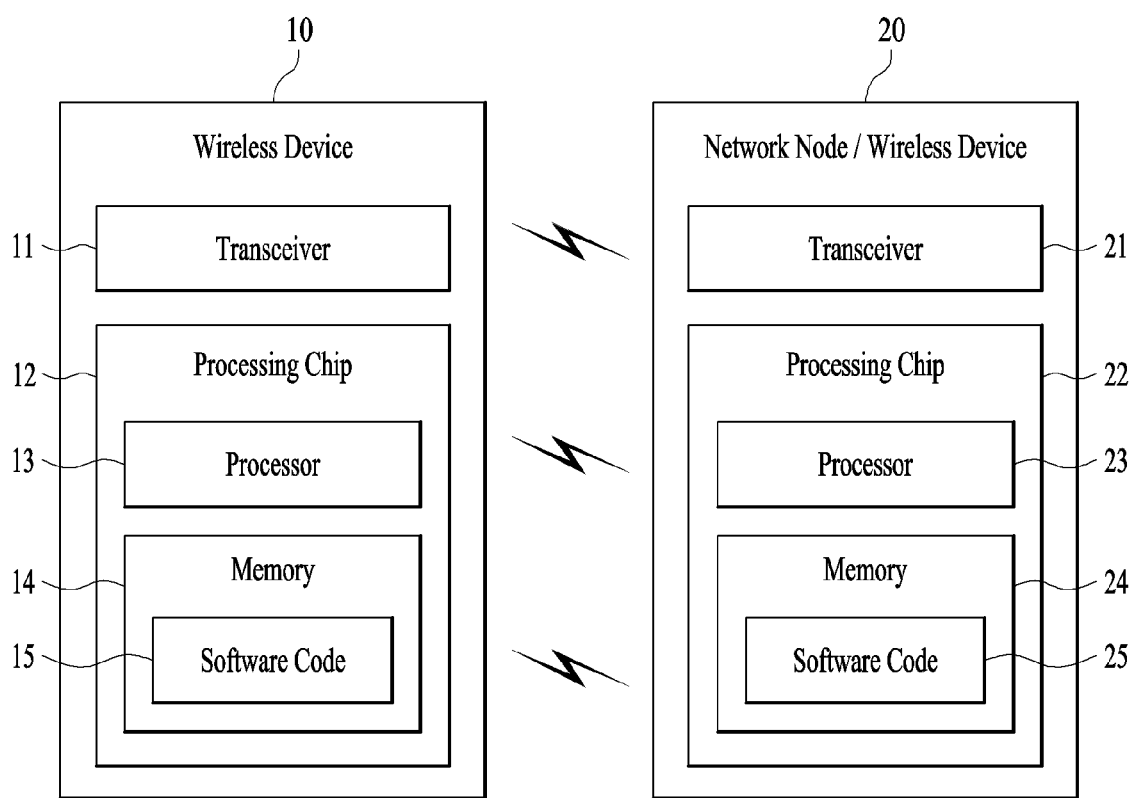
FIG. 12 is a block diagram illustrating components of wireless devices for implementing the present invention.

FIG. 12 is a block diagram illustrating an example of communication between a wireless device 10 and a network node 20. Here, the network node 20 may be replaced with the wireless device of FIG. 12 or a UE.

In this specification, the wireless device 10 or the network node 20 includes a transceiver 11, 21 for communicating with one or more other wireless devices, network nodes, and/or other elements of the network. The transceivers 11 and 21 may include one or more transmitters, one or more receivers, and/or one or more communication interfaces.

In addition, the transceivers 11 and 21 may include one or more antennas. The antennas function to transmit signals processed by the transceivers 11 and 21 to the outside under control of the processing chips 12 and 22 or to receive wireless signals from the outside and transmit the signals to the processing chips 12 and 22, according to an embodiment of the present invention. The antennas are also referred to as antenna ports. Each antenna may correspond to one physical antenna or be configured by a combination of more than one physical antenna element. The signal transmitted from each antenna may not be further divided by the wireless device 10 or the network node 20. A reference signal (RS) transmitted for the corresponding antenna defines the antenna from the perspective of the wireless device 10 or the network node 20 and enables the wireless device 10 or the network node 20 to perform channel estimation for the antenna regardless of whether the channel is a single wireless channel from one physical antenna or a composite channel from a plurality of physical antenna elements including the antenna. That is, an antenna is defined such that a channel for delivering a symbol on the antenna may be derived from the channel through which another symbol on the same antenna is transmitted. A transceiver supporting a multi-input multi-output (MIMO) function to transmit and receive data using a plurality of antennas may be connected to two or more antennas.

In the present invention, the transceivers 11 and 21 may support reception beamforming and transmission beamforming. For example, in the present invention, the transceivers 11 and 21 may be configured to perform the functions illustrated in FIGS. 5 to 8.

In addition, the wireless device 10 or the network node 20 includes a processing chip 12, 22. The processing chips 12 and 22 may include at least one processor, such as a processor 13, 23, and at least one memory device, such as a memory 14, 24.

The processing chips 12 and 22 may control at least one of the methods and/or processes described herein. In other words, the processing chips 12 and 22 may be configured to implement at least one of the embodiments described herein.

The processors 13 and 23 include at least one processor for performing the function of the wireless device 10 or the network node 20 described herein.

For example, one or more processors may control the one or more transceivers 11 and 21 of FIG. 12 to transmit and receive information.

The processors 13 and 23 included in the processing chips 12 and 22 perform predetermined coding and modulation on signals and/or data to be transmitted to the outside of the wireless device 10 or the network node 20, and then transmit the signals and/or data to the transceivers 11 and 21. For example, the processors 13 and 23 convert a data sequence to be transmitted into K layers through demultiplexing, channel coding, scrambling, and modulation processes. The coded data sequence is also referred to as a code word and is equivalent to a transport block, which is a data block provided by the MAC layer. One transport block (TB) is coded into one code word, and each code word is transmitted to a reception device in the form of one or more layers. To perform frequency up-conversion, the transceivers 11 and 21 may include an oscillator. The transceivers 11 and 21 may include $N_t$ transmit antennas (where $N_t$ is a positive integer greater than or equal to 1).

In addition, the processing chips 12 and 22 include a memory 14, 24 configured to store data, programmable software code, and/or other information for implementing the embodiments described herein.

In other words, in the embodiments according to the present invention, when the memories 14 and 24 are executed by at least one processor, such as the processors 13 and 23, the memories allow the processors 13 and 23 to execute some or all of the processes controlled by the processors 13 and 23 of FIG. 19, or store software codes 15 and 25 including instructions for implementing the embodiments described herein based on FIGS. 1 to 11.

Specifically, the processing chip 12 of the wireless device 10 according to an embodiment of the present invention is configured to receive DCI for scheduling an SIB, demodulate and decode the DCI, and descramble a CRC of the DCI using one same SI-RNTI regardless of SIB types. In addition, the processing chip 12 is configured to obtain a value for identifying an SIB type from a specific bit of the DCI, and in this case, bits for an HARQ process ID may be used as the bit for identifying the SIB type. That is, the processing chip 12 may be configured to identify the SIB type using the bits for the HARQ process ID or based on the HARQ process ID if one HARQ process ID has a corresponding relationship with one SIB type. The processing chip 12 is configured to receive the SIB based on scheduling information of a PDSCH included in the DCI and analyze information in the SIB after identifying the SIB type.

In addition, the processing chip 22 of the network node 20 according to an embodiment of the present invention is configured to generate DCI by setting a bit for an HARQ process ID, which is included in the DCI, to a bit value in accordance with a type of an SIB scheduled by the DCI. In addition, the processing chip 22 is configured to scramble a CRC of the DCI using one same SI-RNTI value regardless of SIB types and encode and modulate the DCI. Moreover, the processing chip 22 is configured to transmit the DCI to a UE and transmit, to the UE, a PDSCH including the SIB having the type in accordance with the bit value based on scheduling information of the DCI.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of transmitting and receiving system information and device therefor are described based on the 5G New RAT system, but the method and device can be applied to various wireless communication systems as well as the 5G New RAT system.

What is claimed is:

1. A method of receiving system information by a user equipment (UE) in a wireless communication system, the method comprising:
    receiving Downlink Control Information (DCI) based on a System Information-Radio Network Temporary Identifier (SI-RNTI); and
    receiving a Physical Downlink Shared Channel (PDSCH) based on the DCI,
    wherein the DCI based on the SI-RNTI includes 1-bit information regarding whether system information scheduled by the DCI is a System Information Block 1 (SIB1) or system information other than the SIB1,
    wherein based on the 1-bit information having a value '0,' the SIB1 is received via the PDSCH, and
    wherein based on the 1 bit information having a value '1,' a System Information Block (SIB) other than the SIB1 is received via the PDSCH.

2. The method of claim 1, wherein the DCI is carried on a Physical Downlink Control Channel (PDCCH).

3. The method of claim 1, wherein the SIB1 includes information regarding scheduling of other SIBs.

4. A user equipment (UE) of receiving system information in a wireless communication system, the UE comprising:
    at least one transceiver;
    at least one processor; and
    at least one computer memory connected to the at least one processor and storing instructions that, when executed by the at least one processor, perform operations comprising:
    receiving, through the at least one transceiver, Downlink Control Information (DCI) based on a System Information-Radio Network Temporary Identifier (SI-RNTI); and
    receiving a Physical Downlink Shared Channel (PDSCH) based on the DCI,
    wherein the DCI based on the SI-RNTI includes 1-bit information regarding whether system information scheduled by the DCI is a System Information Block 1 (SIB1) or system information other than the SIB1,
    wherein based on the 1-bit information having a value '0,' the SIM is received via the PDSCH; and
    wherein based on the 1-bit information having a value '1,' a System Information Block (SIB) other than the SIB1 is received via the PDSCH.

5. The UE of claim 4, wherein the DCI is carried on a Physical Downlink Control Channel (PDCCH).

6. The UE of claim 4, wherein the SIB1 includes information regarding scheduling of other SIBs.

7. A method of transmitting system information by a base station (BS) in a wireless communication system, the method comprising:
    transmitting Downlink Control Information (DCI) based on a System Information-Radio Network Temporary Identifier (SI-RNTI); and
    transmitting a Physical Downlink Shared Channel (PDSCH) based on the DCI,
    wherein the DCI based on the SI-RNTI includes 1-bit information regarding whether system information scheduled by the DCI is a System Information Block 1 (SIB1) or system information other than the SIB1,
    wherein based on the 1-bit information having a value '0,' the SIB1 is transmitted via the PDSCH; and
    wherein based on the 1-bit information having a value '1,' a System Information Block (SIB) other than the SIB1 is transmitted via the PDSCH.

8. The method of claim 7, wherein the DCI is carried on a Physical Downlink Control Channel (PDCCH).

9. The method of claim 7, wherein the SIB1 includes information regarding scheduling of other SIBs.

10. A base station (BS) of transmitting system information in a wireless communication system, the BS comprising:
    at least one transceiver;
    at least one processor; and
    at least one computer memory connected to the at least one processor and storing instructions that, when executed by the at least one processor, perform operations comprising:
    transmitting, through the at least one transceiver, Downlink Control Information (DCI) based on a System Information-Radio Network Temporary Identifier (SI-RNTI); and
    transmitting a Physical Downlink Shared Channel (PDSCH) based on the DCI,
    wherein the DCI based on the SI-RNTI includes 1-bit information regarding whether system information scheduled by the DCI is a System Information Block 1 (SIB1) or system information other than the SIB1,
    wherein based on the 1-bit information having a value '0' the SIB1 is transmitted via the PDSCH, and
    wherein based on the 1-bit information having a value '1,' a System Information Block (SIB) other than the SIB1 is transmitted via the PDSCH.

11. The BS of claim 10, wherein the DCI is carried on a Physical Downlink Control Channel (PDCCH).

12. The BS of claim 10, wherein the SIB1 includes information regarding scheduling of other SIB s.

* * * * *